(12) United States Patent
Sper

(10) Patent No.: US 7,270,006 B2
(45) Date of Patent: Sep. 18, 2007

(54) SINGLE BUTTON OPERATING SOUND LEVEL METER AND METHOD THEREFOR

(75) Inventor: Devin Sper, Scottsdale, AZ (US)

(73) Assignee: Sper Scientific Ltd., Scottsdale, AZ (US)

( * ) Notice: Subject to any disclaimer, the term of this patent is extended or adjusted under 35 U.S.C. 154(b) by 177 days.

(21) Appl. No.: 11/190,099

(22) Filed: Jul. 25, 2005

(65) Prior Publication Data

US 2007/0017292 A1 Jan. 25, 2007

(51) Int. Cl.
*G01H 3/12* (2006.01)
(52) U.S. Cl. .......................... 73/646; 73/645
(58) Field of Classification Search .............. 73/645, 73/646; 381/72, 56
See application file for complete search history.

(56) References Cited

U.S. PATENT DOCUMENTS

| | | | | |
|---|---|---|---|---|
| 4,003,264 A | * | 1/1977 | Erlandsson et al. | 73/647 |
| 4,061,042 A | * | 12/1977 | Hetrich | 73/647 |
| 4,257,273 A | * | 3/1981 | Knowd | 73/647 |
| 4,307,385 A | * | 12/1981 | Evans et al. | 73/647 |
| 5,317,273 A | * | 5/1994 | Hanson et al. | 73/646 |
| 5,365,219 A | * | 11/1994 | Wong et al. | 73/646 |
| 5,420,581 A | * | 5/1995 | Peters et al. | 73/645 |
| 7,151,835 B2 | * | 12/2006 | Yonovitz et al. | 73/646 |
| 2003/0065276 A1 | * | 4/2003 | Akita | 600/559 |
| 2004/0089071 A1 | * | 5/2004 | Roark | 73/645 |
| 2006/0219015 A1 | * | 10/2006 | Kardous | 73/645 |

* cited by examiner

*Primary Examiner*—Hezron Williams
*Assistant Examiner*—Nashmiya Fayyaz
(74) *Attorney, Agent, or Firm*—Jeffrey D. Moy; Weiss & Moy, P.C.

(57) ABSTRACT

A sound level monitor device has a microphone. A sound level measurement circuit is coupled to the microphone. The sound level measurement circuit takes sound signals monitored by the microphone and converts the sound signals to digital signals. A display is coupled to the sound level measurement circuit. The display will show the different measurement signal values. A single control button is coupled to the sound level measurement circuit. Pressing the control button a first time activates the sound level measurement circuit so a current measurement signal value is shown on the display. Pressing the single control button a second time causes a highest recorded measurement signal value, since the sound level measuring device has been presently activated, to be shown on the display. The highest recorded measurement signal value remains on the display until a higher recorded measurement signal is monitored. Pressing and holding the single control button for a predetermined time frame deactivates the sound level monitor device.

20 Claims, 3 Drawing Sheets

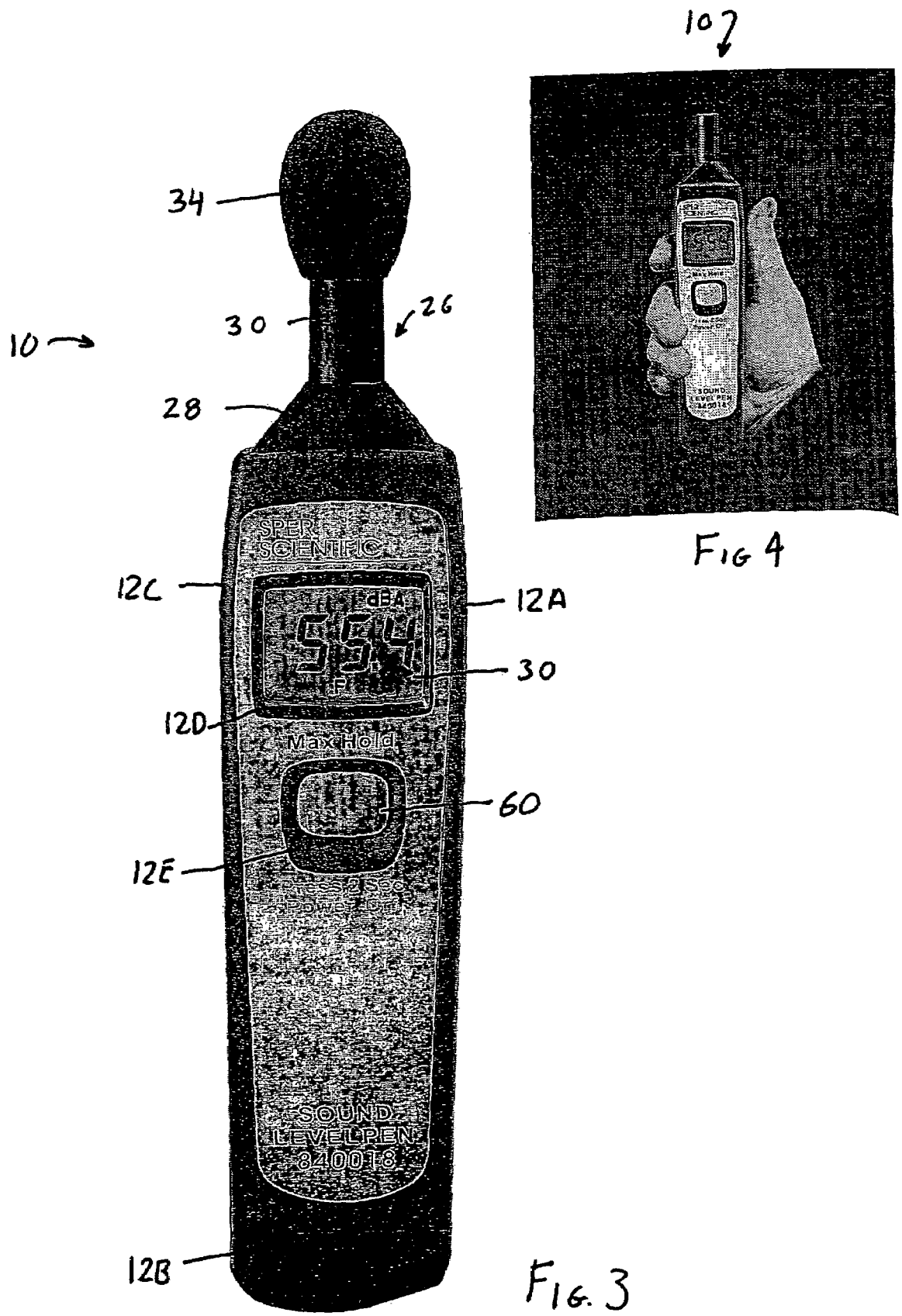

SINGLE BUTTON OPERATING SOUND LEVEL METER AND METHOD THEREFOR

BACKGROUND OF THE INVENTION

1. Field of the Invention

The present invention relates to sound level meters, and more particularly, to an improved sound level meter having single button operation and auto-ranging capabilities.

2. Description of the Prior Art

Noise pollution has become one of the environmental issues deeply connected with everyday life. Noise pollution can include various noises such as factory noise, establishment noise, construction noise, traffic noise, equipment/product noise and the like.

Many noise levels are regulated according to a regulation standard as defined in a noise regulation, for example, by the Noise Regulation Law for the preservation of living environment and the protection of health. OSHA also sets standards regarding noise levels in the workplace. Because of this, many businesses, municipalities, and the like have taken to monitoring and recording sound levels. This is done to ensure that the business, municipality, etc. conform with existing noise level regulations/standards.

Many companies also monitor and record sound levels to ensure quality control on production of products. For example, many companies will monitor the vibrational and operational noise associated with a product to ensure that the noise level of the product is below a certain desired level.

Presently, there are numerous different sound level measuring devices on the market. The problem is that all of the prior art devices are fairly bulky and/or complex to use. All of the prior art devices require the use of a plurality of different buttons in order to record and/or monitor the sound level of a particular area.

Therefore, a need existed to provide an improved sound level measuring device. The improved sound level measuring device must over come the problems associated with prior art sound measuring devices. The improved sound level measuring device must be easy to use and compact in design. The improved sound level measuring device must further have a single control button for controlling a majority of the operating functions of the sound level measuring device.

SUMMARY OF THE INVENTION

In accordance with one embodiment of the present invention, it is an object of the present invention to provide an improved sound level measuring device.

It is another object of the present invention to provide an improved sound level measuring device that over comes the problems associated with prior art sound measuring devices.

It is still another object of the present invention to provide an improved sound level measuring device that is easy to use.

It is yet another object of the present invention to provide an improved sound level measuring device that is compact in design and cheaper on cost.

It is yet another object of the present invention to provide an improved sound level measuring device that has a single control button for controlling a majority of the operating functions of the sound level measuring device.

BRIEF DESCRIPTION OF THE EMBODIMENTS

In accordance with one embodiment of the present invention a sound level monitor device is disclosed. The sound level monitor device has a microphone. A sound level measurement circuit is coupled to the microphone. The sound level measurement circuit takes sound signals monitored by the microphone and converts the sound signals to digital signals. A display is coupled to the sound level measurement circuit. The display will show the different measurement signal values. A single control button is coupled to the sound level measurement circuit. Pressing the control button a first time activates the sound level measurement circuit so a current measurement signal value is shown on the display. Pressing the single control button a second time causes a highest recorded measurement signal value, since the sound level measuring device has been presently activated, to be shown on the display. The highest recorded measurement signal value remains on the display until a higher recorded measurement signal is monitored. Pressing and holding the single control button for a predetermined time frame deactivates the sound level monitor device.

In accordance with another embodiment of the present invention a sound level monitor device is disclosed. The sound level monitor device has a microphone. A sound level measurement circuit is coupled to the microphone. The sound level measurement circuit is used for taking sound signals received by the microphone and converting the sound signals to digital signals. A display is coupled to the sound level measurement circuit for showing different measurement signal values. A single control button is coupled to the sound level measurement circuit. Pressing the control button a first time activates the sound level measurement circuit so a current measurement signal value is shown on the display. Pressing the single control button a second time causes a highest recorded measurement signal value obtained since the sound level measuring device has been presently activated to be shown on the display. The highest recorded measurement signal value remains on the display until a higher recorded measurement signal is monitored. Pressing the control button a third time when the highest recorded measurement signal is shown on the display causes the sound level measurement circuit to display the current measurement signal value on the display. Pressing and holding the single control button for a predetermined time frame deactivates the sound level monitor device. A calibration circuit is coupled to the sound level measurement circuit for sending a calibration signal for electronically calibrating the sound level monitor device.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

FIG. 3 is a close-up perspective view of the sound level measuring device of the present invention.

FIG. 4 is a perspective view of the sound level measuring device of the present invention in a hand of a user.

DETAILED DESCRIPTION OF THE PREFERRED EMBODIMENT

Figure 1:
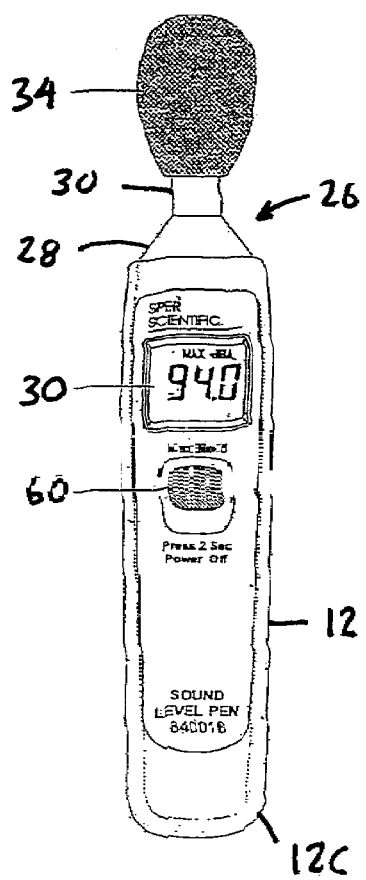
FIG. 1 is a front view of the sound level measuring device of the present invention.
Figure 2:
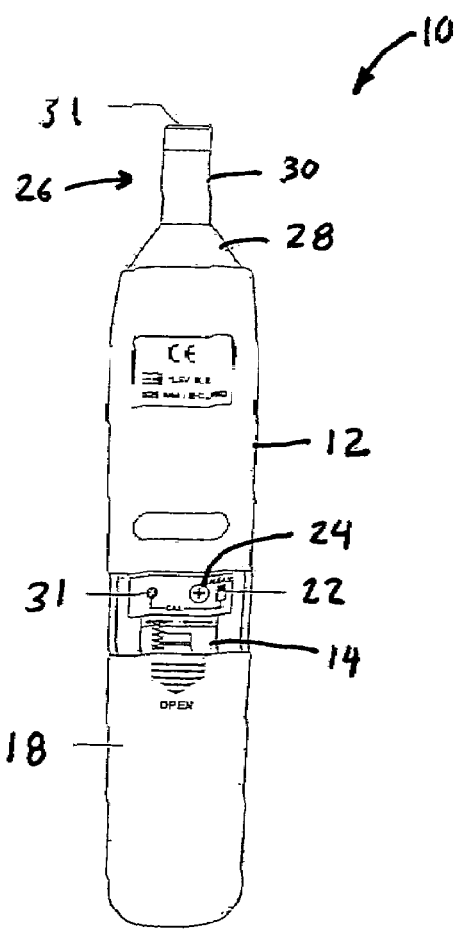
FIG. 2 is a rear view of the sound level measuring device of the present invention.

Referring to FIGS. 1-4, a sound level measuring device 10 of the present invention is shown. The sound level measuring device 10 is unique in that the sound level measuring device 10 uses a single control button 60 for controlling all of the operating functions of the sound level measuring device 10. The sound level measuring device 10 further has auto-ranging capabilities. The sound level measuring device 10 can automatically switch Db ranges without the use of buttons or switches if the sound level exceeds the present set range.

The sound level measuring device 10 has a main body section 12. In the embodiment depicted in the Figs., the main body section 12 is rectangular in shape. However, this should not be seen as to limit the scope of the invention. The main body section 12 may come in other shapes without departing from the spirit and scope of the present invention.

The main body section 12 is sized to comfortably fit in the palm of an average adult as may be seen more clearly in FIG. 4. The main body section 12 has rounded edges 12C. The rounded edges 12C allow for one to grasp the sound level measuring device 10 in a palm in a more comfortable manner.

The main body section 12 is generally made out of a lightweight but sturdy material. The material should be light enough to allow one to comfortably carry the sound level measuring device 10. The material should also be sturdy enough to prevent the main body section 12 from breaking and cracking when dropped from a short distance. In general, the main body section may be made out of a material such as plastic, a lightweight aluminum, or the like. The listing of the above should not be seen as to limit the scope of the present invention.

The main body section 12 may be of a single unit construction. Alternatively, in accordance with one embodiment of the present invention, the main body section 12 is comprised of an top section 12A and a bottom section 12B.

The front surface of the main body section 12 will have a first opening 12D formed therein. The first opening 12D is used as a window to allow one to view a display screen 30. A second opening 12E is also formed in the front surface of the main body section 12. The second opening 12E is formed to position a control button 60 on the front surface of the main body section 12.

The main body section 12 will have a hollow interior section 14. The hollow interior section 14 is used to house the circuitry 16 of the sound level measuring device 10. As may be seen more clearly in FIG. 2, the back surface of the main body section 12 may have a removable cover section 18. The removable cover section 18 allows one to have access to a power supply 20. The power supply 20 is used to power the sound level measuring device 10. In general, the power supply 20 is a battery. The removable cover section 18 further allows one to access an internal calibration switch 22. The internal calibration switch 22 is used to activate an internal oscillator to accurately calibrate the sound level measuring device 10. The removable cover section 18 may also cover one or more coupling devices 24. The coupling devices 24 are used to secure the top section 12A to the bottom section 12B if the main body section 12 is comprised of two sections.

Coupled to and extending out of a top surface of the main body section 12 is a housing 26. The housing 26 has a base section 28 which is coupled to the main body section 12. Extending out of the base section 28 is a cylindrical column 30. A small opening 31 is formed on a top surface of the cylindrical column 30. A microphone 32 is positioned in the housing 26. The housing 26 is used to protect the microphone 32 from damage. The opening 31 in the top surface of the cylindrical column 30 allowing the microphone 32 to accurately monitor the sound level. In general, the housing 26 is made from the material as the main body section 12.

A windscreen 34 is generally positioned on the cylindrical column 30. The windscreen 34 covers the opening on the top surface of the cylindrical column 30. The windscreen 34 permits the free passage of sound waves without modifying the frequency response of the microphone 32. The windscreen 34 reduces wind velocity which eliminates wind noise, pop noises, and breath sounds while remaining acoustically transparent.

Figure 5:
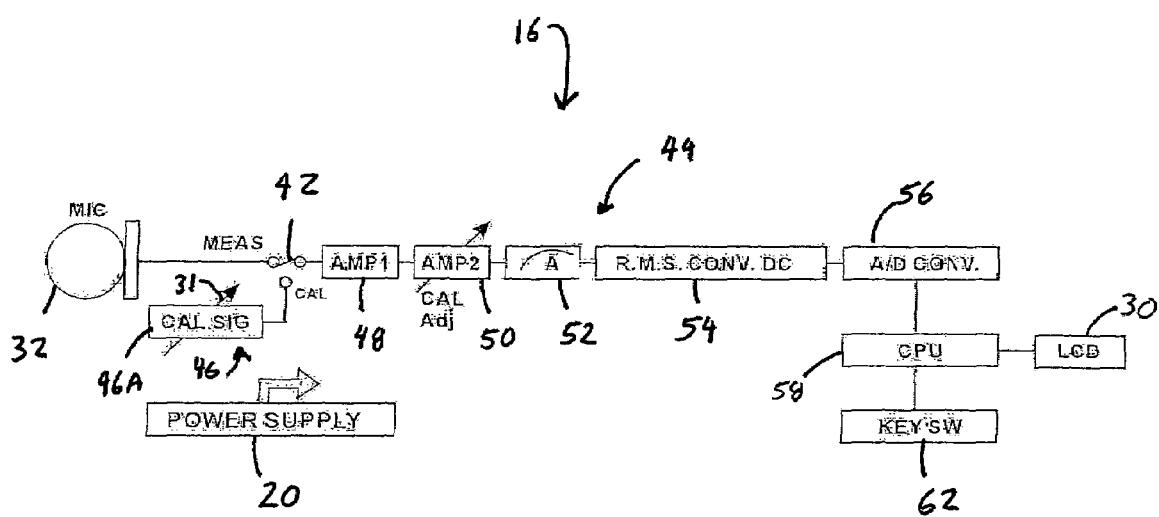
FIG. 5 is a simplified functional block diagram of the circuitry of the sound level measuring device of the present invention.

Referring to FIG. 5, a simplified functional block diagram of the circuitry 16 of the sound level measuring device 10 of the present invention is shown. The circuitry 16 has a microphone 32. The microphone 32 accurately catches sound waves and converts it into electrical signals. The microphone 32 is coupled to a switch 42. The switch 42 couples the microphone to a sound measuring circuit 44 or to a calibration circuit 46.

The calibration circuit 46 is an internal oscillator 46A. The internal calibration switch 22 is used to activate an internal oscillator 46A to accurately calibrate the sound level measuring device 10. When activated, the internal oscillator 46A will send a signal of a predefined frequency and sound level (i.e, 94 dB, 1 kHz, sine wave) for electrical calibration of the sound level measuring device 10. The display 30 will show "CAL" to indicate the calibration mode. The display 30 will then display the level of the calibration signal (i.e., 94 dB). If the display shows a value that differs from the calibration signal, one needs to adjust the a calibration dial 31 until the desired value appears on the display 30.

The sound measuring circuit 44 takes the sound signals from the microphone 32 and converts it to digital signals which are sent to a processor unit 58. In the embodiment depicted in FIG. 4, the sound measuring circuit 44 has an amplifier 48. The amplifier 48 is used to increases the strength of the electrical signals passing through it. In the embodiment depicted, a second amplifier 50 is coupled to the output of the first amplifier 48. The second amplifier 50 is an adjustable amplifier. The adjustable amplifier 50 is used with the calibration circuit 46. If the display shows a value that differs from the calibration signal, one needs to adjust the adjustable amplifier 50 (i.e., calibration dial 31) until the desired value appears on the display 30. A filter 52 is coupled to the output of the second amplifier 50. The filter 52 is used to clear up the output signal from the second amplifier 50 by rejecting certain signals, vibrations, or radiations of certain frequencies while allowing others to pass. The output signal from the filter 52 then is sent to an RMS value detection circuit 54. Most sounds that need to be measured fluctuate in level. To measure the sound properly, the sound measuring circuit 44 needs to be able to measure these variations as accurately as possible. Most sounds that need to be measured fluctuate in level. For this reason, two detector response characteristics were standardized. These are known as "F" (for Fast) and "S" (for Slow). The "F" Characteristic provides a fast reacting display response enabling us to follow and measure not too rapidly fluctuating sound levels. The "S" Characteristic provides a slower response which helps average-out the display fluctuations on an analogue meter, which would otherwise be impossible to read using the "F" characteristic. The RMS value detection circuit 54 allows for sound measurements to be made at the site and then level range set in consideration of the full measurement time. The output signal from the RMS value detection circuit 54 is sent to an A/D converter 56. The A/D converter 56 will convert the analog signal from the RMS value detection circuit 54 to a digital output signal.

The digital signal from the A/D converter 56 is sent to a processor 58. The processor 58 matches the digital signal output from the A/D converter 56 with a measurement level and sends the measurement level to a display 30. The display 30 being used to show the different measurement signals. Other information may be shown on the display. For example, the response characteristic used may be shown, a "MAX" symbol may be shown to indicate a maximum value, etc. Any type of display 30 may be used. In general, an LCD panel or the like is used for the display 30.

The processor 58 further allows the sound level measuring device 10 to be auto-ranging. The processor 58 is programmed to automatically switch ranges if the sound level exceeds a certain scale. For example, the processor 58 may be programmed with a first scale range from 40-80 dB and a second scale range from 80-120 dB. Thus, if the sound level exceeds 80 dB, the processor 58 will automatically switch ranges. No switch is required to switch scale ranges.

A single control button 62 is coupled to the processor 58. The control button 62 is used to control all operating functions of the sound level measuring device 10. By pressing the control button 62 a first time, the sound level measuring device 10 is activated and the current recorded sound level is shown on the display 30. By pressing the control button 62 a second time, the highest recorded value since the sound level measuring device 10 has been presently activated will be displayed. The high value will remain on the display 30. As stated above, a "MAX" symbol may be shown to indicate a maximum value is being displayed. Each time a higher value is monitored by the sound level measuring device 10, the processor 58 sends the new high value to the display 30. By pressing the pressing the control button 62 a second time, the sound level measuring device 10 will again display the current recorded sound level on the display 30. By pressing and holding the control button 62 for a predetermined time frame, approximately two or more seconds, the sound level measuring device 10 will be deactivated.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A sound level monitor device comprising:
    a microphone;
    a sound level measurement circuit coupled to the microphone for taking sound signals received by the microphone and converting the sound signals to digital signals;
    a display coupled to the sound level measurement circuit for showing different measurement signal values; and
    a single control button coupled to the sound level measurement circuit, wherein pressing the control button a first time activates the sound level measurement circuit so a current measurement signal value is shown on the display, pressing the single control button a second time causing a highest recorded measurement signal value since the sound level monitor device has been presently activated to be shown on the display, the highest recorded measurement signal value to remain on the display until a higher recorded measurement signal is monitored, and pressing and holding the single control button for a predetermined time frame deactivating the sound level monitor device.

2. A sound level monitor device in accordance with claim 1 further comprising pressing the control button a third time when the highest recorded measurement signal is shown on the display causes the sound level measurement circuit to display a current measurement signal value on the display.

3. A sound level monitor device in accordance with claim 1 further comprising a calibration circuit for sending a calibration signal for electronically calibrating the sound level monitor device.

4. A sound level monitor device in accordance with claim 3 further comprising a calibration dial for adjusting the calibration signal.

5. A sound level monitor device in accordance with claim 1 further comprising:
    a calibration circuit for electronically calibrating the sound level monitor device; and
    a switch for coupling one of the calibration circuit or the microphone to the sound level measurement circuit.

6. A sound level monitor device in accordance with claim 5 further comprising a calibration dial for adjusting the calibration signal.

7. A sound level monitor device in accordance with claim 1 further comprising a main body section having a hollow interior section for housing the microphone and the sound level measurement circuit.

8. A sound level monitor device in accordance with claim 5 further comprising a main body section having a hollow interior section for housing the microphone, the sound level measurement circuit, and the calibration circuit.

9. A sound level monitor device in accordance with claim 7 further comprising a windshield coupled to the main body section for permitting free passage of sound waves without modifying the frequency response of the microphone.

10. A sound level monitor device in accordance with claim 1 wherein the sound level measurement circuit comprises:
    an amplifier coupled to the microphone;
    an RMS value detection circuit coupled to the amplifier;
    an A/D converter coupled to the RMS value detection circuit;
    a processor coupled to the A/D converter, the display, and the single control button.

11. A sound level monitor device in accordance with claim 10 wherein the sound level measurement circuit further comprises an adjustable amplifier coupled to the amplifier.

12. A sound level monitor device in accordance with claim 11 wherein the sound level measurement circuit further comprises a filter coupled to the adjustable amplifier.

13. A sound level monitor device comprising:
    a microphone;
    a sound level measurement circuit coupled to the microphone for taking sound signals received by the microphone and converting the sound signals to digital signals;

a display coupled to the sound level measurement circuit for showing different measurement signal values;

a single control button coupled to the sound level measurement circuit, wherein pressing the control button a first time activates the sound level measurement circuit so a current measurement signal value is shown on the display, pressing the single control button a second time causing a highest recorded measurement signal value since the sound level monitor device has been presently activated to be shown on the display, the highest recorded measurement signal value to remain on the display until a higher recorded measurement signal is monitored, pressing the control button a third time when the highest recorded measurement signal is shown on the display causes the sound level measurement circuit to display a current measurement signal value on the display, and pressing and holding the single control button for a predetermined time frame deactivating the sound level monitor device; and a calibration circuit coupled to the sound level measurement circuit for sending a calibration signal for electronically calibrating the sound level monitor device.

14. A sound level monitor device in accordance with claim 13 further comprising a calibration dial for adjusting the calibration signal.

15. A sound level monitor device in accordance with claim 14 further comprising a switch for coupling one of the calibration circuit or the microphone to the sound level measurement circuit.

16. A sound level monitor device in accordance with claim 13 further comprising a main body section having a hollow interior section for housing the microphone, the sound level measurement circuit, and the calibration circuit.

17. A sound level monitor device in accordance with claim 15 further comprising a main body section having a hollow interior section for housing the microphone, the sound level measurement circuit, and the calibration circuit.

18. A sound level monitor device in accordance with claim 17 further comprising a windshield coupled to the main body section for permitting free passage of sound waves without modifying the frequency response of the microphone.

19. A sound level monitor device in accordance with claim 13 wherein the sound level measurement circuit comprises:

an amplifier coupled to the microphone;

an RMS value detection circuit coupled to the amplifier;

an A/D converter coupled to the RMS value detection circuit;

a processor coupled to the A/D converter, the display, and the single control button.

20. A sound level monitor device in accordance with claim 19 wherein the sound level measurement circuit further comprises adjustable amplifier coupled to the amplifier.

* * * * *